Feb. 20, 1934.    J. L. SPENCE, JR    1,948,319
METHOD OF NUMBERING MOVING PICTURE FILMS AND APPARATUS THEREFOR
Filed Oct. 20, 1931    3 Sheets-Sheet 1
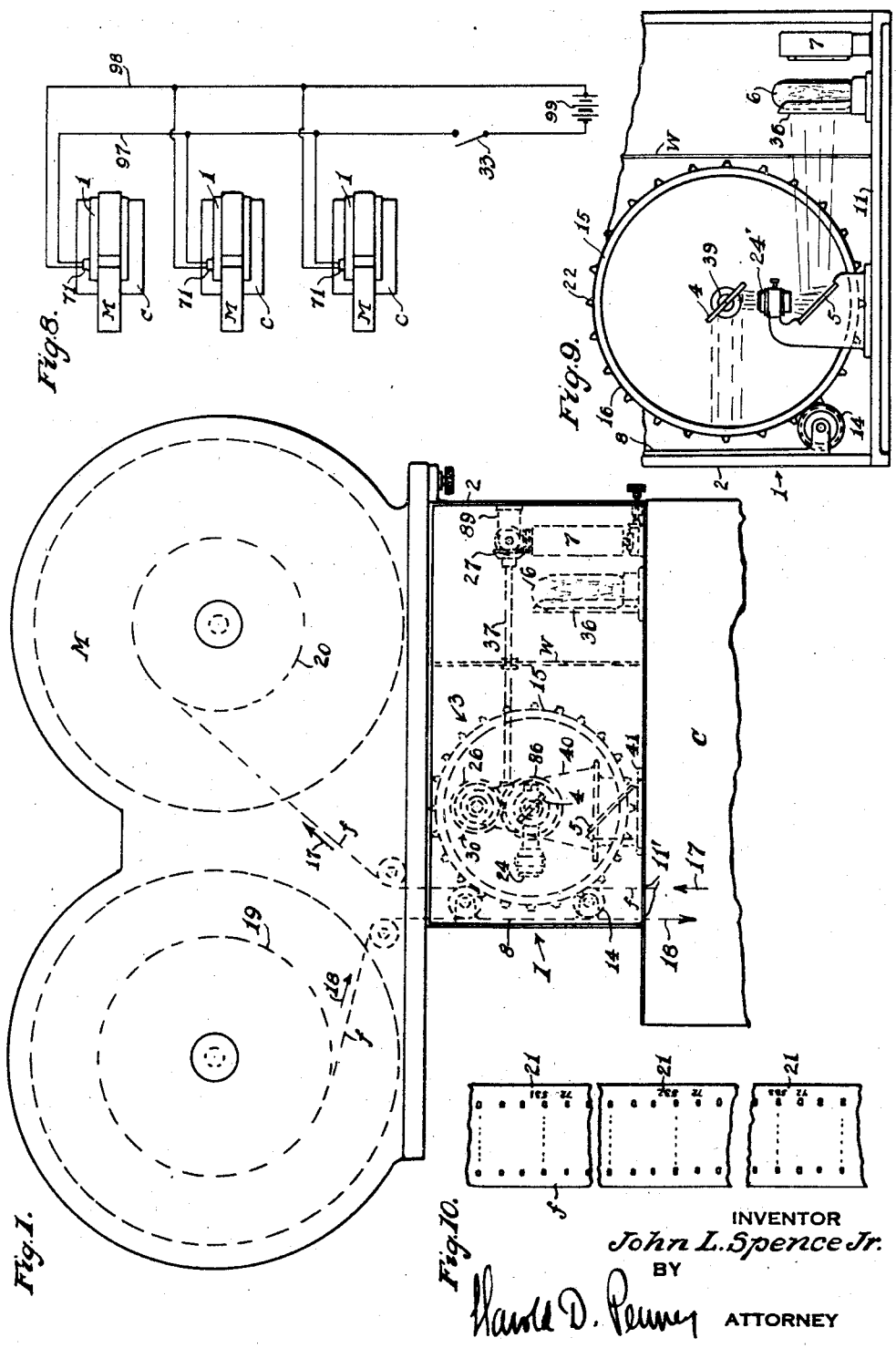
INVENTOR
John L. Spence Jr.
BY
Harold D. Penney   ATTORNEY

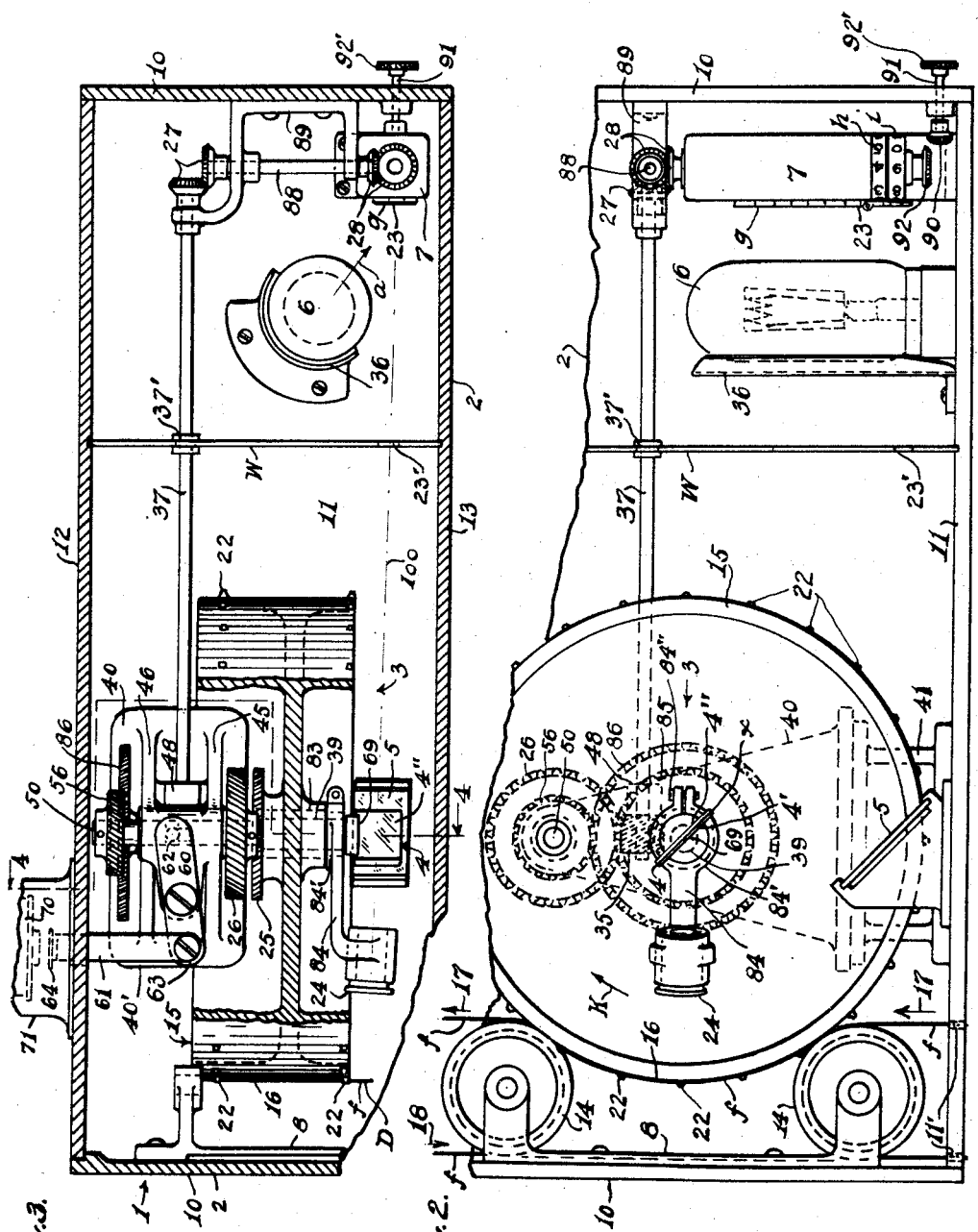

Feb. 20, 1934.  J. L. SPENCE, JR  1,948,319
METHOD OF NUMBERING MOVING PICTURE FILMS AND APPARATUS THEREFOR
Filed Oct. 20, 1931  3 Sheets-Sheet 3
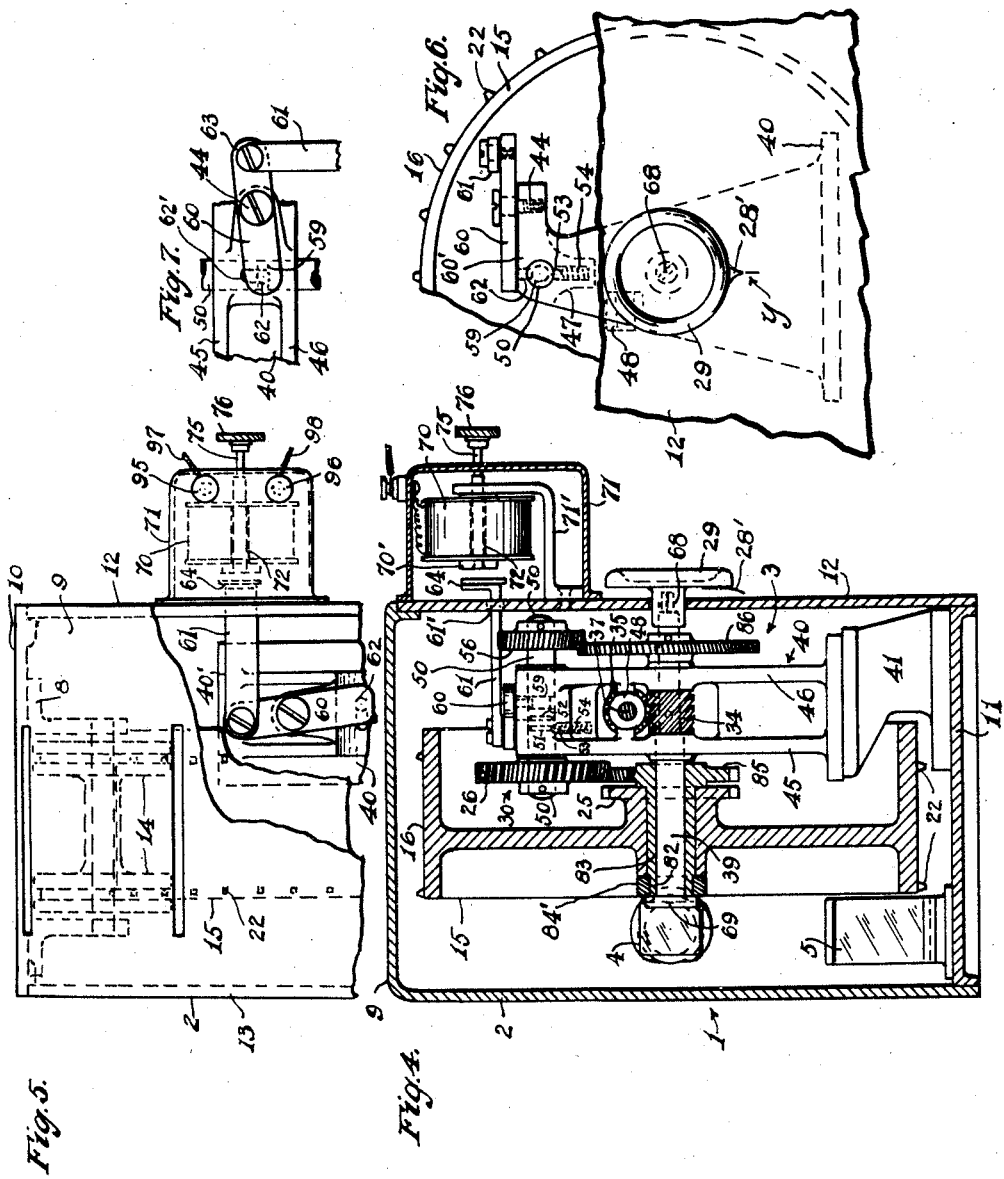
INVENTOR
John L. Spence Jr.
BY
Harold D. Penney  ATTORNEY Patented Feb. 20, 1934

1,948,319

UNITED STATES PATENT OFFICE 1,948,319

METHOD OF NUMBERING MOVING PICTURE FILMS AND APPARATUS THEREFOR

John L. Spence, Jr., New York, N. Y., assignor, by mesne assignments, to Remac Patents Corporation, New York, N. Y., a corporation of New York Application October 20, 1931. Serial No. 569,980

25 Claims. (Cl. 95—1.1)

The present invention relates to improvements in methods and apparatus for numbering films, and has for its principal object the provision of means whereby moving picture and sound recording negative films during the exposure thereof may have impressed thereon, preferably photographically, a series of sequential numbers or symbols, said numbers being imprinted upon said film at predetermined intervals during the running of said films.

Another object is to provide a means and method whereby picture and sound films may be substantially simultaneously at equal intervals marked with identical progressively changing serial numbers or the like for identifying corresponding film footage.

A further object of the invention is the provision of a photographic means whereby such desired numbers may be spaced along one edge of a film and, preferably, of a sensitive negative film which has been unexposed or previously exposed, such numbers, thereafter, being developed with subsequent film treatment.

A further object is to provide resettable numbering device with means whereby a number indicating device may be run in stepped synchronism with the movement of the film, to present sequential objective numbers for photographing upon the film as it runs, and to provide means for disabling said numbering device and to start the same thereafter at a predetermined time, when a plural number of sound and picture recording means, have reached synchronism.

This latter feature has to do with the utilization, at one time, of a plurality of cameras and sound recording devices all taking the same picture so that when a plurality of machines are started together and approach synchronous speeds the picture is then taken and the counting mechanisms for numbering the sequential footage of the films is simultaneously thrown into operation for the like numbering of all films under exposure.

Another advantage is that the present device may be interconnected or mounted upon any standard sound recording or film camera by interposing the said structure between the film reel housing and the recording machine or camera. It will also be obvious that the apparatus may be inbuilt as an integral part of such camera or sound recording machine.

The present device is for the purpose of utilization in synchronously operated sound recording machines and cameras and for the purpose of permitting a plurality of cameras and recording machines to arrive at synchronism, after which the action is commenced and is then photographed upon the film and sequentially therewith the printing of the footage indicating numbers is also initiated.

The use of sequential spaced numbering on films has several advantages, one of which is that in editing a negative sound and picture film after it has been taken, the sound film and picture film, both of which have been synchronously operated and numbered, both films may be edited by the removal, where necessary of undesired or edited portions of said film, their identity being alike so that the numbers upon one film will indicate such portions of both films as must be removed to obtain subsequent synchronized sound and picture sequence of the reassembled film during projection, thereby maintaining synchronous continuity of both picture and sound after deletion of the undesired sections.

A further advantage lies in that, in some instances, where positive talking films have been distributed for projection, a breakage or destruction of a portion of the film may be readily identified by the identifying numbers carried thereon; and this admits of the recording of certain sections of the injured film by number, for replacement, thereby permitting the restoration of the broken portion of the film and thereby maintain its synchronous continuity with the coacting sound and picture film.

These and other capabilities will be ascertained as the herein description proceeds, and it is obvious that modifications may be made in the invention without departing from the spirit of the invention or the scope of the appended claims.

In the drawings,

Fig. 1 is a side elevation showing the present improved apparatus supported between a film magazine and the upper part of a camera or sound recording machine.

Fig. 2 is a side elevation of the apparatus, one side plate of the casing being removed to show the mechanism.

Fig. 3 is a horizontal sectional view partly in plan of the apparatus as in Fig. 2 showing the upper portion of the drum broken away exposing gear mechanism.

Fig. 4 is a sectional elevation taken on the line 4—4 of Fig. 3, showing the magnetic gear shift arrangement, with manual control.

Fig. 5 is a fragmentary plan of Fig. 4.

Fig. 6 is a fragmentary side elevation of the apparatus as in Fig. 4, showing the gear supporting bracket and the reset knob.

Fig. 7 is a fragmentary plan showing the gear shift lever arrangements.

Fig. 8 is a diagrammatic plan of a series of my apparatus, electrically connected for synchronous starting and operation.

Fig. 9 is a side elevation, with a side plate removed, of an alternate lens construction; and Fig. 10 shows a fragment of a film with the numerals thereon.

The apparatus 1, as in Fig. 1, comprises an entirely enclosing light proof casing 2, in which is contained the operative film numbering mechanism 3, to be later described, said apparatus being, in the present instance, located between a standard film holding and feeding magazine generally denoted by M. Beneath the apparatus 1 is located a camera, sound or picture C. As thus constructed and mounted the numbering device fixedly joins the magazine M and the camera C into joint assembly.

Very briefly stated, the film numbering mechanism 3 includes a mirror shaft 39 (Fig. 4) rotatable on a support 40, 45, 46, on which shaft is rotatable a sleeve 83 supporting a sprocket 15 rotatable on the sleeve by means of the moving perforated film *f* drawn against said sprocket by the action of the sound or picture camera.

A lens 24 (Fig. 2) is carried radially on said sleeve; and an illuminated visual counter 7 (Fig. 2) driven from said shaft by operative connections 27, 28, 37, 35, 34; has light from its symbols reflected by a fixed mirror 5 to a rotatable mirror 4 diametric on said shaft and moving at half speed of the sprocket, whence the light is reflected through the lens 24 and thereby focused on the edge D (Fig. 3) of the film.

A mechanism 30 (Fig. 4) adapted to be clutched to the sprocket wheel 15 constrains said sprocket, sleeve and lens to move at the same speed, and said shaft and mirror to move at half the speed of the sprocket, whereby the focused image moves at the same speed as the film, and is photographed clearly on the sensitive side of the margin D of the film.

In use, these film numbering devices are operated in groups, and said mechanism 30, when unclutched may be adjusted to put the mirrors and lens all in step after which they are simultaneously clutched by means of magnets 70 (Fig. 4), all controlled by a single switch 33 (Fig. 8) whereby all of the devices are started in synchronism.

Now the parts of the apparatus will be described in detail.

The film numbering means within the casing 2 is caused to operate by the traveling film *f* shown dotted in the magazine M, the direction of travel of said film being in the direction of the arrows 17—18, the film feed reel designated by 19, and 20 designating the take up film reel. As shown, the film feeding structure is standard and is driven by the usual suitable drive means from the camera, not shown, but well understood.

The casing 2 is provided with a base 11, slotted at 11', to permit the film *f* to travel to and from the camera C below. As the film passes down, it is guided on one side by idlers 14 mounted on the bracket 8; and as it passes up from the camera, it is guided by the other side of said idlers 14 into engagement with the side 16 of the sprocket 15.

The casing 2, further has a top cap housing portion 9 (Fig. 4), having integral end walls 10 (Fig 3), and a rear wall 13. A removable front wall 12, is so arranged as to permit entry to the casing when desired.

As in Figs. 2 and 3, there is affixed to the base 11 a source of illumination 6, comprising a light and its base, which is connected to a current source not shown.

This light, in turn is angularly deflected by a reflector shield 36 in the general direction of the arrow *a*, Fig. 3, so that it illuminates the face *g* of a number dial or wheel 23 of a vertically mounted numbering or counting device 7 of standard make. At the base of the counting device 23 is rotatably and externally mounted a separately, manually settable pair of symbol rings *h* and *i*. These rings may carry alphabetical or numerical symbols thereon as a symbol group entirely independent of the number or counter group *g*. The purpose of these particular rings *h* and *i* are to carry index means to be rotatably brought into focus so as to impress each separate film with a film identifying character or symbol which is repeated on the film with the footage indicating numerals so as to be able to identify each film by a common symbol, apart from the footage indications. Thus a film will carry an identifying index corresponding to its name or title. In use, each time a film is run through the herein device the title symbols on rings *h* and *i* are selected and set, and are not again altered till another film of different subject is run through.

The counter 23, however is altered continuously, so that, as the film passes through the apparatus each foot thereof is numbered consecutively from 1 to 1000, or more as the case may be.

Thus a film may bear on each foot of its length a compound symbol such as the combined title and footage symbols 1—1, 1—2, 1—3 etc., the title symbol, remaining throughout film length, at foot intervals, while the footage symbols 1—2—3 etc. will numerically change.

The counter mechanism, must, of course, be reset upon the commencement of each starting of a new film, and for this purpose, as in Fig. 2 the lower end of the counter is provided with a bevel gear 92 connected by a shaft to the counters *g* in the well known manner, and a reset means comprising a shaft 91, longitudinally movably and rotatably mounted adjacent to the gear 92, in wall 10, carries a gear 90 on its inner end, with a knurled thumb nut 92' on its exposed end. The gear 90 may be engaged with the gear 92 and rotated to reset the counters *g* when desired.

As a means for constantly rotating the counter mechanism to set up consecutive footage numbers, the upper end of the counter housing 7 mounts a bevel gear 28 which is connected to the counter means which operate the counters *g*. A mate bevel gear 28 is carried on a shaft 88, Fig. 3, and the two gears 28 are constantly meshed. The shaft 88 is rotatably carried in a U-shaped bracket 89 affixed to wall 10, said bracket rotatably supporting one end of a right angled drive shaft 37. Shafts 37 and 88, carry mated meshing bevel gears 27. The shaft 37 is supported at its opposite end in a bearing 48, this end being supplied with a helical gear 35 (Fig. 4), this in turn being in mesh with a similar gear 34 which is fixedly mounted to resettable revolving mirror shaft 39. As thus described any rotation of the shaft 39 operates to consecutively operate the counters *g*.

In order to protect the film *f* from the light means 6, the casing is provided with a wall W, Figs. 2 and 3, there being a felt-bushed opening 37' therein for permitting the counterdrive shaft 37 to pass therethrough. This wall, further, has a slot 23' cut therein, to permit the image of the footage and symbol indices to pass therethrough to the fixed mirror 5. This slot 23' is narrow and thereby acts as a narrow mask to shield off all undesired symbols or numbers except those required as images, to be photographed upon the film edge for identifying purposes.

As previously stated, the film f, in passing to the take-up reel 20 from the camera C, drives the herein described mechanism, as will now be further explained. Mounted upon a bracket support 40—41, having bifurcated bearing standards 45—46, Fig. 4, is a toothed film engaging sprocket or drum 15, having teeth 22 thereon. Over this sprocket and at one side thereof, as at 16 (Fig. 2), the film f is passed, the holes therein engaging the teeth 22, and in passing upwardly from the camera C in the direction of the arrows 17 of the film causes the sprocket to revolve in the direction of arrow K.

The sprocket face 16 is narrower in breadth than the film f as may readily be seen in Fig. 3, at D, so that one edge of the film overhangs the sprocket edge, and thus this edge D is in unobstructed position to receive thereon an impression of the transmitted image of the symbols, to be later described more in detail.

The sprocket 15 is freely and rotatively mounted upon a sleeve 83, Fig. 3, upon the inner end of which, Figs. 3 and 4, is an integrally mounted gear 85. The opposite outer end of the sleeve 83 is of reduced diameter, forming a stepped portion 82. Upon this stepped portion is secured a radial arm 84 formed at its end with a split cylindrical clamp ring 84' which is held on said portion by means of a clamping screw 84'' (Fig. 4). This arm 84 carries a lens 24 disposed radially to the sleeve 83.

The sprocket 15 has an inner integral gear 25 on its hub, the sprocket hub being held on the sleeve by the gear 85 and clamp ring 84'. Thus the sprocket is held for free rotation, but is provided with the gear 25 for interengagement with a shiftable driven gear means, now to be described.

At the upper ends of the brackets 45, 46, Fig. 6, is an integral platform 60' at one end of which is rotatably mounted a slide shaft 50. On opposite ends of this slide shaft are mounted gears 26 and 56. The gear 26 is, in turn, engageable with either the film sprocket gear 25 or sleeve gear 85, both of these latter being of equal diameter.

The revolving mirror drive shaft 39 has on one end a head 69 (Fig. 4) carrying a mirror 4 diametric to the axis of the shaft, and at the end of said shaft opposite to the mirror 4, is a gear 86 meshed with a gear 56 on the sliding shaft 50. As thus disclosed, the slidable shaft 50 has gears 26 and 56 mounted on its opposite ends, so that when the shaft 50 is slid inwardly the gear 26 engages the gear 25 and the gears 85 and 86 are in driving engagement with the gears 26 and 56, so that rotation of the sprocket wheel rotates all of said gears; but when shaft 50 is slid outwardly, the gear 25 on the sprocket or drum 16 is uncoupled and the gears 26, 56, 85, 86 are not driven. This action of uncoupling gears 25—26 is done manually as will be explained, and leaves the drum free of its driving connection with the counter driving shaft 37.

For the purpose of sliding the gear 26 into or out of engagement with the driver gear 25 there is arranged, as in Figs. 3 to 7 inclusive, a pivoted link gear throw means. The link throw means is mounted upon a flat platform 60' located upon the top of the base standards 45 and 46. To this is pivotally mounted by means of a pivot screw 44, a throw lever 60, at one end of which is affixed a shaft throw coupling comprising a depending pin 62 which passes through a slot 62' (Fig. 7) in the top of the bearing of the slide shaft 50, and engages in a circular groove 59 (Fig. 6) cut in shaft 50.

As the lever 60 is moved on its pivot 44 during rotation of the shaft 50 and its gears 26—56, the gear 26 is moved to mesh or unmesh from drum gear 25, without unmeshing gears 85—86, as disclosed best in Fig. 4.

To accomplish the actuation of meshing and unmeshing gears 25—26 a manually operated means is provided wherein the link lever 60 is pivotally connected at one end 63 to one end of a bar 61, the opposite end of this bar 61 being extended through a slot 61' in the side wall 12, as in Fig. 4, and bent at right angles with a load plate thereon as at 64. This structure is of steel and is located adjacent the end of the core 70' of a wound coil magnet 70.

The magnet 70 is mounted on a fixed holding bracket 71' attached to the wall 12, and this assembly is enclosed by a housing 71 which is also mounted on wall 12.

A pair of magnet terminals 95—96 (Fig. 5) in electrical connection with the coil 70 and the wiring 97—98 (Fig. 8), with a source of current supply 99, Fig. 8, complete the electrical meshing means for automatically meshing gears 25—26 at the proper instant as will later be described in detail.

For manually unmeshing gears 25—26, there is provided a non-magnetic pusher plunger 75 having a thumb nut 76 thereon, which is centrally mounted in an axial bore 72 in the core 70'. Normally this plunger is retracted as shown in Figs. 4 and 5. When pressed forward by hand, this plunger forces the lever assembly 60—61 into the positions shown in Figs. 3-4-5 and 7, thus freeing the drum gear 25 from the driven counter gear train 26—56—34—35—27—28, thus disconnecting the counter mechanism from being driven.

The shaft 50 is held against accidental displacement by a ball 53 (Fig. 4) slidable in a vertical bore in the bearing 47 and pressed by a spring 54 into one or the other of annular grooves 51 or 52 around the shaft 50.

When the mechanism is thus disconnected, the drum is free to be set with a film thereon to any desired starting position, and the mirror 4 and mirror drive shaft 39 and the counter mechanism are also free to be started at the necessary zero or starting settings. Thus, when the film is threaded through the numbering device, the camera C and the magazine M, the mirror and lens system, to be described, and the counter means may also be individually set. The counters g may be set at zero or starting numbers by means of the reset means 90—91, 92 as previously described. In this manner the coordination of all the coactive means may be set for the start of filming sound and action.

When the plunger 75 has been actuated to set the apparatus as shown in the settings as of Figs. 3 to 7, inclusive, and has been withdrawn as shown in Fig. 5, the mirror-lens structure, now to be described is also set to coordinate its action of imprinting index and footage indices upon the film edge.

To this end, the mirror shaft 39, in addition to having the counter driving gear 34, thereon, with gear 86, has also a reset knob 29 on its outer end 68, projecting through the wall 12, for manual control. The knob 29 carries an index pointer 28' thereon, Fig. 6, with a position index line y inscribed on the wall 12 of the housing.

When the knob and pointer 28' are as shown in Fig. 6, the lens and mirror are as in Fig. 2, and light beams from the symbols of the counter strike the mirror 5, are reflected to the mirror 4 and thence through the lens 24 to the sensitized face of the projecting margin D (Fig. 3) of the film, and there focused on the film as shown at 21 in Fig. 10.

As the mirror moves at half the speed of the lens, first one face 4' (Fig. 2) and then the face 4'' of the mirror are presented to the light beams when the lens is in forward position. This half speed movement of the mirror causes the beam reflected therefrom to move angularly at the same speed as the lens and film, so that the focused image is stationary relative to the film, and photographs sharply.

As shown by the broken line 100 (Fig. 3) the counter 7, mirror 4 and lens 24 are in a plane slightly inclined to the plane of the sprocket, in order to permit the images to be projected upon said projecting margin D.

The operation of the device as in Figs. 1 to 8 is as follows:

The switch 33 (Fig. 8) being open and the gear 26 (Fig. 4) being unmeshed from the gear 25, the counters 7 are all synchronized by manipulating the button 92', and the lenses 24 and mirrors 4 are all synchronized by manipulating the knob 29 until the lens is, for instance, forward and the pointer 28' (Fig. 6) is at the index y.

Then the instruments may be started and after they have all gotten up to speed and are feeding film and rotating the sprocket 15 at speed, the switch 33 is closed, thus causing the magnet 70 to attract the armature 64 and cause the gear 26 to mesh with both gears 25 and 85.

This causes the lens 24 to move in synchronism with the sprocket, and causes the mirror to rotate half the speed of the lens, thus projecting the image of the counter symbols upon the sensitized face of the projecting margin D of the film, thus photographing the same progressively varying symbols on all of the films once for each rotation of the sprocket, whereby corresponding parts of each film are marked with corresponding footage symbols.

In the form of invention of Fig. 9, the parts are all about as in Figs. 1 to 7, except that the lens 24' is fixed on a vertical axis between the fixed mirror 5 and the rotating mirror 4, and the sprocket rotates directly on the mirror shaft 39 the sleeve 83 being omitted. The mirror is rotated at half the speed of the sprocket in the same manner as in the other species by similar mechanism not shown in Fig. 9.

The light beam from the counter is reflected from the mirror 5 through the lens to the mirror 4 and thence to the margin D of the film. The part of the beam between the mirror 4 and the margin D moves angularly with the sprocket and film, so that the image on said margin is stationary relative to the film, and is therefore clear.

I claim as my invention:

1. In combination, means for guiding movable film, said film having a continuously projecting margin; a counter having symbols thereon; means for focusing an image of said symbols on the margin and moving it with the film.

2. In combination, a rotatable sprocket receiving perforated film passing against the sprocket; said sprocket adapted to cause one margin of the film to continuously project therebeyond; a counter; and means for causing rays of light from the counter to move radially to the axis of the sprocket; and means for causing said rays to be focused on the margin.

3. In combination, means for guiding a film, said means including a sprocket, said sprocket adapted to cause one margin of the film to continuously project therebeyond; a counter; and means for causing symbols on the counter to be printed on the margin.

4. In combination, a film, a guide therefor, a counting means for printing counting symbols on the film and for printing on the film a symbol identifying the counting means.

5. In combination, a movable film, means guiding said film and movable thereby; a counter including symbols; means cooperating with the first mentioned means and said counter for imprinting an image of said symbols on the film, and identifying means for said counter, said second means adapted also to imprint an image of the identifying means on said film.

6. In combination, means for guiding movable film whereby to cause one margin thereof to continuously project; a counter having symbols thereon; and a lens movable with the film for focusing an image of said symbols on the margin, and means including the first mentioned means for moving said lens with the film.

7. In combination, a rotatable sprocket receiving perforated film passing against the sprocket; a counter; a mirror rotating at half the speed of the sprocket and positioned to cause rays of light from the counter to move radially to the axis of the sprocket.

8. In combination, a support; a mirror shaft therein; a sleeve rotatable on said shaft; a sprocket rotatable on said sleeve by perforated film guided against the sprocket; a lens carried radially on said sleeve; a counter driven by said shaft; a mirror diametric on said shaft reflecting light from the counter through the lens to the edge of the film; and a mechanism for constraining said sleeve to move with the sprocket, and said shaft to move at half the speed of the sprocket.

9. In combination, a support; a mirror shaft therein; a sleeve rotatable on said shaft; a sprocket rotatable on said sleeve by perforated film guided against the sprocket; a lens carried radially on said sleeve; a counter driven by said shaft; a mirror diametric on said shaft reflecting light from the counter through the lens to the edge of the film; and a mechanism for constraining said sleeve to move with the sprocket, and said shaft to move at half the speed of the sprocket, said mechanism comprising adjacent synchronizing and drive gears of the same diameter fast on said sleeve and sprocket; a slide shaft rotatable and longitudinally slidable in said support and carrying fast thereon a small gear, and a wide gear engageable with both said drive and synchronizing gears at the same time to constrain them to rotate together; a large gear on the mirror shaft engageable with said small gear and of a size to rotate the mirror shaft and mirror at half the speed of the sprocket wheel and sleeve; the slide shaft being longitudinally slidable to disengage the wide gear from the drive gear to permit the sprocket to be set relative to the lens.

10. In combination, a mirror shaft; a sprocket rotatable coaxially with said shaft by perforated film passed against said sprocket; a counter driven from said shaft; a mirror diametric on said shaft reflecting light from the counter to the film; a fixed lens between said counter and mirror for focusing said light on the film; and a mechanism for constraining said shaft to move at half the speed of the sprocket.

11. In combination, a support; a mirror shaft on said support; a sleeve rotatable on said shaft; a sprocket rotatable on said sleeve; means for guiding perforated film against said sprocket; a lens carried radially on said sleeve; a visual counter driven by said shaft; a rotatable mirror diametric on said shaft; a fixed mirror for reflecting light from the counter to the rotatable mirror and thence through the lens to the edge of the film; and mechanism for constraining said sprocket and sleeve to move at the same speed, and said shaft to move at half the speed of the sprocket.

12. In combination, a sprocket formed on one of its sides without a margin outside of its teeth for guiding movable film, said sprocket being narrower than the film to leave a projecting edge portion of film; a counter having symbols thereon; and means for focusing an image of said symbols on said projecting edge portion.

13. In combination, a rotatable sprocket receiving perforated film passing against the sprocket; a counter; and a double face mirror diametric to the axis of the sprocket and moving at half the speed of the sprocket and positioned for causing rays of light from the counter to move radially to the axis of the sprocket; and means for causing said rays to be focused on the film.

14. In combination, a rotatable sprocket receiving perforated film passing against the sprocket; a counter; means for causing rays of light from the counter to move radially to the axis of the sprocket; means for focusing said rays on the film; and means for at will operatively connecting the counter with the sprocket.

15. In combination, a rotatable sprocket; a counter; a mirror rotatable diametric to the axis of said sprocket and positioned reflecting light from the counter through the lens to the film; means for focusing the light on the film; mechanism for constraining said mirror to move at half the speed of the sprocket; and means for at will clutching and unclutching said mechanism to and from the sprocket.

16. In combination, a film marking device comprising a sprocket receiving and movable with the film; a counter having symbols thereon and movable by said sprocket; means for causing said symbols to be printed on the film; a clutch for connecting the counter to the sprocket; and magnetic means for controlling said clutch.

17. In combination, a group of film numbering devices adapted to be disabled; and electrical means having control means at a distance from the devices for simultaneously setting in operation all of said devices.

18. In combination, a film numbering device, as described, and means including an electrical circuit having a switch therein for controlling said device at a distance.

19. In combination, a marking device comprising a sprocket receiving and movable with the film, a counter having symbols thereon and movable by said sprocket, means for causing said symbols to be printed on the film; a clutch for connecting the counter to the sprocket; and electrical means extending from the device for controlling said clutch at a distance.

20. In combination, a counter; means for guiding movable film and for causing one margin thereof to continuously project; means for causing an image of the counter symbols to be focused on the margin, said latter means including a lens, which latter is adapted to move with the film; and a wall between the counter and film having a narrow slit therein for the passage of said light, for limiting the light to the margin of the film.

21. A method comprising feeding a sensitive film, causing one margin thereof to project and simultaneously photographing counting symbols on the film margin.

22. A method of film printing comprising feeding a plurality of films; causing margins thereof to project, and simultaneously marking said margins with corresponding symbols.

23. In combination with movable films, individual numbering means therefor, separate actuating means for the first mentioned means, means connecting the separate actuating means and extending therefrom, and a single control disposed in said connecting means.

24. In combination with synchronously movable films, a counter including like symbols for each film, means for imprinting images of said symbols on the respective films during their movement, identifying means also including symbols for each counter, and means including the first mentioned means for imprinting images of the second mentioned symbols on said films.

25. In combination, a movable perforated film, a sprocket rotatable by said film, a light source, and mechanism associated with said sprocket and operable thereby for marking said film during its movement; said mechanism including a counter which receives light from said source, a revolvable axis having movement relative to said sprocket and wherein the latter is mounted, a lens disposed between said axis and said film, and a mirror having plural faces rigidly mounted on said axis whereby plural images of said counter may be focused on said film during a single revolution of said axis.

JOHN L. SPENCE, JR.